US008747226B2

(12) United States Patent
McCarten et al.

(10) Patent No.: US 8,747,226 B2
(45) Date of Patent: Jun. 10, 2014

(54) CAR-BASED ENTERTAINMENT SYSTEM WITH VIDEO GAMING

(75) Inventors: David McCarten, Bothell, WA (US); Peter Eck, Olympia, WA (US); Scott Elliott, Snoqualmie Pass, WA (US); Hiroshi Kamada, Kyoto (JP)

(73) Assignee: Nintendo of America, Inc., Redmond, WA (US)

( * ) Notice: Subject to any disclaimer, the term of this patent is extended or adjusted under 35 U.S.C. 154(b) by 1067 days.

(21) Appl. No.: 11/175,044

(22) Filed: Jul. 6, 2005

(65) Prior Publication Data

US 2006/0009289 A1    Jan. 12, 2006

Related U.S. Application Data

(60) Provisional application No. 60/585,641, filed on Jul. 7, 2004.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63F 13/12 | (2006.01) | |
| G06F 9/455 | (2006.01) | |
| A63F 13/08 | (2006.01) | |

(52) U.S. Cl.
CPC ............... *A63F 13/12* (2013.01); *A63F 13/08* (2013.01); *A63F 2300/209* (2013.01); *A63F 2300/207* (2013.01); *A63F 9/24* (2013.01); *G06F 9/455* (2013.01)
USPC ................... 463/42; 463/39; 463/40; 463/43; 463/48

(58) Field of Classification Search
CPC .... A63F 13/00; A63F 13/08; A63F 2300/209; A63F 2300/207; A63F 9/24; G06F 9/455
USPC ..................... 463/39, 40, 42, 43, 48
See application file for complete search history.

(56) References Cited

U.S. PATENT DOCUMENTS

| | | | |
|---|---|---|---|
| 5,555,466 A | 9/1996 | Scribner et al. | |
| 5,581,270 A | 12/1996 | Smith et al. | |
| 5,794,164 A * | 8/1998 | Beckert et al. | ............... 455/3.06 |
| 5,822,023 A | 10/1998 | Suman et al. | |
| 5,923,306 A | 7/1999 | Smith et al. | |
| 5,959,596 A | 9/1999 | McCarten et al. | |
| 6,047,127 A | 4/2000 | McCarten et al. | |
| 6,147,663 A | 11/2000 | Smith et al. | |
| 6,147,696 A | 11/2000 | Smith et al. | |

(Continued)

*Primary Examiner* — Kevin Y Kim
(74) *Attorney, Agent, or Firm* — Nixon & Vanderhye P.C.

(57) ABSTRACT

A car area network is disposed in a car to enable communications between various devices in the car. An existing consumer electronics device (CED) coupled to the car area network (CAN) performs an existing consumer electronics device function. That existing (CED) is adapted to control various devices coupled to the CAN including video gaming devices. In one example, the adapted CED cooperates with a game server to effect game play. In another example, the adapted CED functions as a virtual video game platform to support play of video games. A multifunction controller transmits control information to the adapted CED via the car area network to permit a car occupant to control the adapted CED to permit the occupant to play a video game using the video game display. One or more audio and/or visual devices coupled to the CAN may also be controlled by commands transmitted from the adapted CED or from the multimedia controller over the CAN.

31 Claims, 7 Drawing Sheets

(56) References Cited

U.S. PATENT DOCUMENTS

| | | | |
|---|---|---|---|
| 6,148,253 A * | 11/2000 | Taguchi et al. | 701/48 |
| 6,154,186 A | 11/2000 | Smith et al. | |
| 6,181,996 B1 * | 1/2001 | Chou et al. | 701/36 |
| 6,507,810 B2 * | 1/2003 | Razavi et al. | 703/24 |
| 6,559,812 B1 | 5/2003 | McCarten et al. | |
| 6,590,503 B1 | 7/2003 | Elliott | |
| 6,672,963 B1 * | 1/2004 | Link | 463/43 |
| 6,678,892 B1 | 1/2004 | Lavelle et al. | |
| 6,716,103 B1 | 4/2004 | Eck et al. | |
| 6,762,733 B2 | 7/2004 | Smith et al. | |
| 6,769,989 B2 | 8/2004 | Smith et al. | |
| 6,811,492 B1 | 11/2004 | Arakawa et al. | |
| 6,884,171 B2 | 4/2005 | Eck et al. | |
| 7,114,171 B2 * | 9/2006 | Brady et al. | 725/77 |
| 2003/0028690 A1 * | 2/2003 | Appleby-Alis et al. | 710/8 |
| 2003/0032486 A1 | 2/2003 | Elliott | |
| 2003/0063756 A1 | 4/2003 | Geerlings et al. | |
| 2003/0226148 A1 * | 12/2003 | Ferguson | 725/75 |
| 2004/0083491 A1 | 4/2004 | Chang | |
| 2004/0097288 A1 | 5/2004 | Sloate et al. | |
| 2004/0176170 A1 | 9/2004 | Eck et al. | |
| 2004/0237119 A1 | 11/2004 | Smith et al. | |
| 2005/0130744 A1 | 6/2005 | Eck et al. | |
| 2005/0148376 A1 * | 7/2005 | Kucera | 463/1 |

* cited by examiner

CAR-BASED ENTERTAINMENT SYSTEM WITH VIDEO GAMING

CROSS REFERENCE TO RELATED APPLICATION

Priority is claimed from U.S. provisional patent application, entitled "Car-Based Video Game System," Ser. No. 60/585,641, filed on Jul. 7, 2004, the content of which is incorporated here by reference.

TECHNICAL FIELD

The invention relates to entertainment systems that include video gaming, and more particularly, to a car entertainment system that integrates video gaming.

BACKGROUND AND SUMMARY

Traditionally, video games have mostly been played on hardware that is stationary and local to the video game user. Users usually go visit a video game arcade to play arcade video games, and home video game users typically purchase a home video game system such as the Nintendo GameCube System or a home computer to play video games at home. To play a game at home, the user usually selects a video game on a optical disk or other storage device (or in the case of a personal computer or other system, he or she may download the game from the Internet or other network) and controls the local hardware to begin executing the game. The game is displayed on the user's home television set or computer display.

As the opportunity for leisure family travel has increased throughout the general population, the travel industry has adapted by providing travel facilities with many of the comforts of home. Many hotels now have amenities for younger travelers to make a family's stay more pleasant and convenient. Similarly, airlines now routinely show movies, videos and other multi media during flights to entertain younger passengers and help them pass the time. Cruise lines generally attempt to provide luxury accommodations including all of the comforts of home for travelers of all ages.

Playing video games can often be an excellent way to pass the time while waiting to travel or during travel. An airplane or train ride may seem to pass more quickly if one is able to spend the time playing a challenging, fun interactive video game. Similarly, the idea of taking young children to a hotel or on a cruise ship may be daunting unless one has a way to entertain the children and keep them from becoming bored. The ability to play video games in hotel rooms and cruise ship cabins is a significant benefit to parents and other caregivers who wish to entertain children and keep them busy and occupied.

To meet these needs, systems were developed in the past for distributing video game play among a number of users in a hotel, airplane, or other context. It has been possible in the past for an airline passenger to play video games on a so-called "seat back controller"—basically a miniature personal computer installed within the back of the airplane seat in front of you. Also, it has long been possible through a television distribution system commercialized by LodgeNet to play Nintendo video games in a hotel room using a standard television set and hand held controllers.

While the technology described above has been successful in allowing airline passengers, hotel room guests and the like to play video games, a need exists to extend this technology to passengers in a car. The term "car" is a broad term and refers without limitation to any personal transportation vehicle, e.g., passenger automobile, a truck, a van, a minivan, a sport-utility vehicle, a recreational vehicle, industrial and farm equipment like tractors and combines, a motorcycle, a scooter, a personal boat, a personal airplane, etc.

Nevertheless, certain features, aspects, and advantages of the embodiments described herein can be used with other vehicles. Although handheld and other portable game playing devices, like NINTENDO GAMEBOY and laptop computers, are options for car entertainment, one of course must remember to bring the handheld or portable device when traveling. Game cartridges, CDs, etc. relating to different games also must be brought for certain gaming platforms. Users must also provide a place in the limited space of a car compartment to store such devices. And such storage space may not be readily accessible to the user, particularly when the car is in operation. It would be convenient to include a video game playing system in the car itself with storage and selection from a wide range of games already included within the system. Moreover, such a car video game playing system could offer larger display screens as well as larger, more sophisticated, and easier to use game playing control devices. Indeed, existing display(s) and/or speakers in the car may be advantageously employed.

Additional factors must be considered including providing some functionality to provide a "rugged" or robust video gaming system that can withstand considerable bumping and abrupt movements associated with car driving and still reliably function. Extreme temperatures experienced in cars must also be accommodated. In addition, cartridges, cassette tapes, and optical disks and other removable game storage media require insertion into a game playing machine or PC, but may be less suitable for such a rugged environment. A more robust and hardened game storage, selection, and/or execution approach is desirable.

It would also be desirable to utilize not only existing game platforms but also non-gaming platforms that already exist in cars, e.g., car radio and sound systems, CD players, DVD players, GPS systems, televisions, etc. in order to keep cost to a minimum. The inventors recognized the benefits of integrating a wide variety of entertainment and other services in addition to gaming in a car. Security of the game content is also an important issue and mechanisms should be established to safeguard that content from misappropriation and other misuse. Another goal is to provide a car owner, car entertainment store, car dealer, or other entity with an easy way to obtain new games or update existing games stored on the car gaming system.

The present invention solves these and other problems and concerns by providing an integrated, reliable, rugged/hardened, secure, inexpensive, and readily updateable car control and service system that performs various car control functions and offers a variety of entertainment services including video gaming.

A car area network is disposed in a car to enable communications between various devices in the car. An existing consumer electronics device (CED) coupled to the car area network (CAN) performs an existing consumer electronics device function. That existing (CED) is adapted to control various devices coupled to the CAN including video gaming devices. In one example game server embodiment, the adapted CED cooperates with a game server to effect game play. A multifunction controller transmits control information to the adapted CED via the car area network to permit a car occupant to control the adapted CED to permit the occupant to play a video game using the video game display. One or more audio and/or visual devices coupled to the CAN may also be controlled by commands transmitted from the adapted CED or from the multimedia controller over the CAN.

In another example emulation embodiment, the adapted consumer electronics device includes an emulator or transcompiler for emulating hardware functionality of one or more dedicated video game platforms. The emulated hardware includes CPU hardware, graphics hardware, and audio hardware functionalities of the one dedicated video game platform. Any consumer electronics device equipment coupled to the car area network may be controlled using commands from the adapted consumer electronics device sent over the car area network. The adapted consumer electronics device may deliver to the video game display audio and visual information over an audio/visual bus coupled between the one consumer electronics device and the video game display. Alternatively, the adapted consumer electronics device may deliver to the video game display digitally encoded audio and visual information from the one consumer electronics device over the car area network assuming the car area network has sufficient bandwidth to transfer the information to permit satisfactory game play.

A menu is displayed to a car occupant including consumer electronic device options and video game options. The selected menu option is received over the car area network at the adapted consumer electronic device. If the selected menu option is a video game, the game selection is provided to the adapted consumer electronic device over the car area network. A game data file corresponding to the game selection is transferred over the car area network to the adapted consumer electronic device. Executable code in the adapted consumer electronic device is executed in order to run the selected video game corresponding to the stored game data file. Audio and video game information is displayed to the car occupant. Game play commands from the car occupant entered on a controller by the car occupant are transmitted by the controller over the car area network to the adapted consumer electronic device.

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using non-limiting examples, the present invention may be employed to in any type of car entertainment system that including electronic gaming. In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
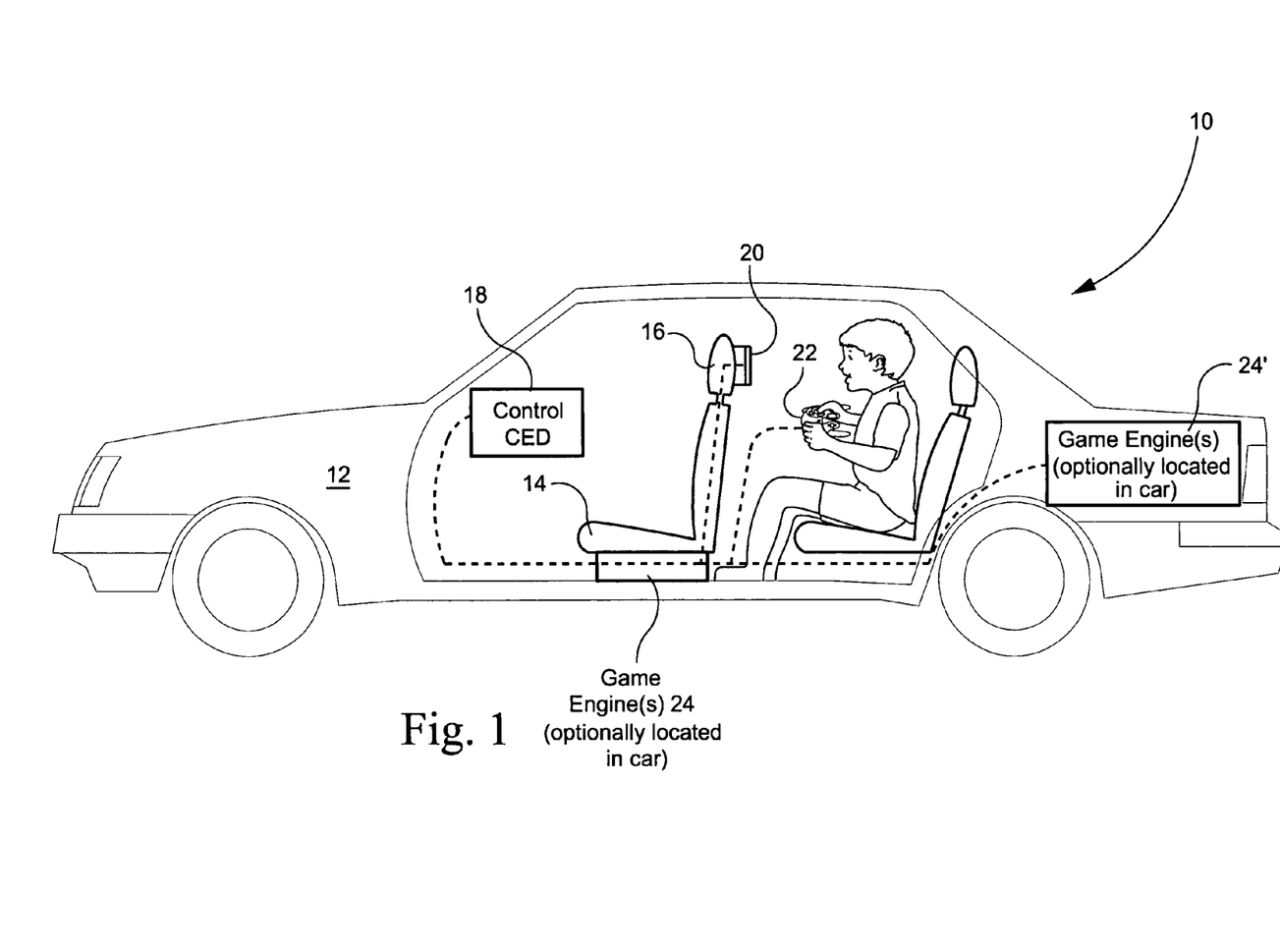
FIG. 1 illustrates one example and non-limiting configuration for a car video gaming system having a car area network (CAN) in a car.

FIG. 1 shows a non-limiting, example car-based entertainment system 10 that includes video gaming employed in an example car 12. The car-based entertainment system 10 preferably makes use of some existing control, circuitry, wiring, sound system, display system, network, bus, or other infrastructure already installed in the car. For example, the car-based entertainment system 10 uses an existing consumer electronics device (CED) 18 shown as being accessible to a car occupant in the front seat 14 for operation by the driver or passenger next to the driver. The existing consumer electronics device 18 may be, for example, a car radio, a sound system, a CD player, a DVD player, a GPS navigator, a television, a satellite radio, a mobile radio, etc., that is adapted to interface with a car area network (described later) and to perform a variety of control entertainment functions including video gaming function that would otherwise not be performed by the existing CED.

The control CED 18 is shown in this example coupled by any suitable signal connection to one or more game engine(s) or server(s) 24 located in the car, either inside the passenger compartment (e.g., under one of the seats) or outside the passenger compartment (e.g., the trunk 24'). Although the trunk is an attractive location in terms of aesthetics, comfort, and other factors, the game engine(s) or server(s) may be flexibly mounted in any suitable location including the dash board area, between seats as part of a between-seat console unit, in or attached to the roof, under one or more seats, incorporated into the back of one or more seats, etc. In other example implementations, the game engine(s) or server(s) may be located outside of the car and communicate with the control CED 18 via wireless and/or wired networks outside the car.

The signal communication may be by wire, glass fiber, or wireless link. The dashed line simply indicates a signal connection without specifying a particular type or medium of connection. Wireless transmission has the advantage of eliminating the need for wiring installation but also requires that the various communicating units have suitable wireless transceivers. But an air interface may also have some limitations that are not factors in a wired interface. As described below, a preferred signaling connection is a car area network. Assuming a car area network (CAN) is used, one non-limiting example wired network is an Ethernet-based local area network, and one non-limiting example wireless network is an IEEE 802.11 type wireless local area network.

For gaming, the control CED 18 in one example implementation can be configured to permit the driver (e.g., parent) to monitor, and if desired, select games for play rear seat passengers (e.g., children) as well as other conditions such as volume, duration, etc. In other implementations, selections can be made by any car occupant using a controller, or as described in an example embodiment below, using an integrated, multitask controller. The game engine(s)/server(s) 24 include or are coupled to memory, e.g., a game library, for storing multiple video game programs with associated data. When the game engine(s)/server(s) 24 are located in the car, they may be coupled to game displays 20 via a video bus to provide game video signals for game play. But again, the game video may be delivered to the display(s) via wire or wireless link.

The one or more displays 20 may be mounted or otherwise accessible in the car for use by one or more passengers. Each display 20 may be any type of display. One example is an LCD type of display preferably with a wide angle of viewing, an anti-glare screen, and physically moveable or at least pivotable. The display 20 in FIG. 1 is mounted in or on a head rest 16, but other locations may be desirable including in or on the seat back, an arm rest, from the car roof, on the car dash, or elsewhere.

Game audio may be delivered from the game engines to the car radio via an audio/video bus or by sound system speakers already situated in the car. Alternatively, earphone or headset jacks coupled to the game engine(s) may be located at or near each display 20 to permit individual passengers to listen to the game audio without disturbing others using individual earphones or headsets. Alternatively, the each display 20 may include a speaker. The game audio may be delivered to the radio, speakers, and earphone or headset jacks via wire or wireless link. Wireless headsets are also suitable.

Each passenger location associated with a display has a controller 22 of some sort, e.g., a game or multifunction controller, with multiple buttons, switches, and/or joystick(s). The game controller may be used to generate game select signals if game choices are displayed on a menu, to select other forms of entertainment such as radio, music, movies (if a DVD or VCR is provided in the car entertainment system), etc., and game play signals, e.g., move game objects across the display 20. Again, game controller signals may be delivered via wire or wirelessly.

The game playing equipment is preferably hardened or sufficiently rugged to satisfactorily and reliably function in the extreme temperature and temperature swing, bumpy, vibratory, and physically changing environment of a moving car. Standard consumer mass storage devices may be replaced with mass storage devices selected for extended environmental characteristic such as extended temperature and vibration range. For example, the game engine storage may be a hard drive rather than a stack of CDs or DVDs. A hard drive is less susceptible to dysfunction in bumpy and vibratory environments. Alternatively, standard hard disk drives may be used, but further protected from environmental extremes of the mobile environment using measures such as shock mounting and enhanced, active cooling fans. Flash memory may be used as a storage alternative. Any game platform, non-game platform, or game emulator may be used.

Figure 2:
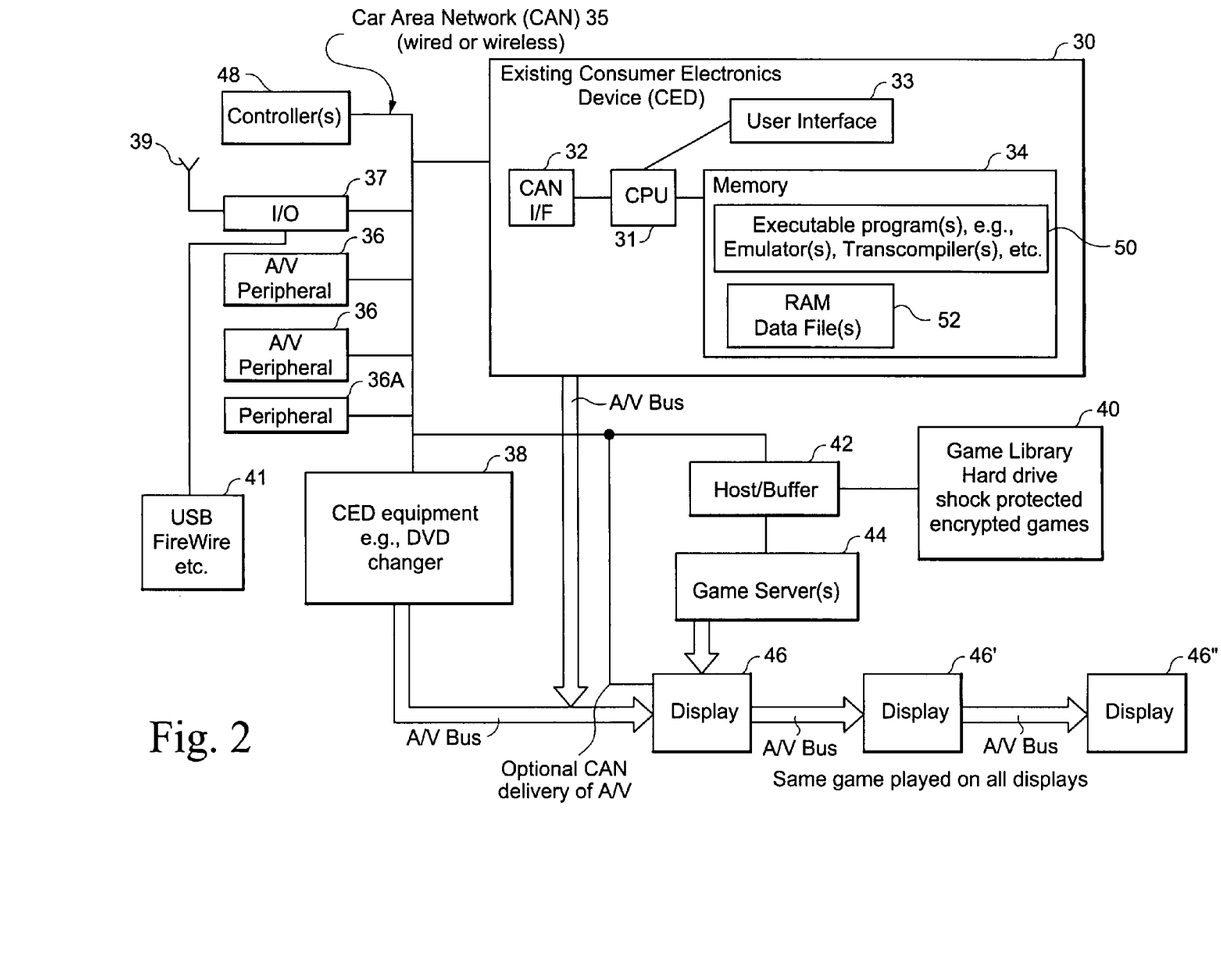
FIG. 2 is a function block diagram showing a first example and non-limiting game server embodiment for a car entertainment and control system integrating video gaming using having a car area network (CAN)

One example implementation of a car-based entertainment system is shown in FIG. 2. The figure is in function block form to simplify the illustration, but it is to be understood that the system shown in FIG. 2 is suitably installed in a car as described above. One non-limiting example video game platform is a Nintendo GAMECUBE game platform. Details of a Nintendo Gateway GAMECUBE game platform are provided in U.S. patent application Ser. No. 10/293,943, filed on Nov. 14, 2002, the entire contents of which are incorporated herein by reference.

An existing consumer electronics device (CED) 30 is adapted to be a control CED. Before adaptation, the CED 30 already includes basic hardware, such as a central processing unit (CPU) and related circuitry 31, memory 34, and a user interface 33, and basic software, such as an operating system and one or more applications. As a non-limiting example, the existing CED may be a DVD player. The existing consumer electronics device. (CED) 30 is adapted to include a car area network (CAN) interface (I/F) 32 coupled to the CPU block 31 to permit the control CED to communicate via the car area network 35. The memory 34 may need to be expanded (or not depending on the memory already present in the control CED) for example emulation embodiments described below. In those emulation embodiments, executable code 50 such as one or more game platform emulators or one or more game transcompilers may be stored along with video game data files used by the executable code to emulate a selected video game.

The adapted control CED 30 is coupled to one or more audio and/or visual (A/V) peripherals 36 and possibly to one or more other type(s) of peripherals 36A via the car area network (CAN) 35. Example peripherals include another DVD player, an MP3 player, a VCR, an audio cassette player, a sound system, a GPS or other navigation system, a liquid crystal display (LCD) system, a gaming system already installed in the car, etc. An input/output block 37 may include a radio transceiver for communicating wirelessly via antenna 39 or other wired transceiver for communicating by a USB, FireWire, or other port. If wired, the CAN 35 may be a high-speed, serial bus, (e.g., a USB), but a parallel or other bus structure could be used.

The control CED 30 may have associated equipment 38, e.g., a DVD changer and an audio/visual bus in the case where the control CED 30 is a DVD player, coupled to the CAN 35. That consumer electronics device equipment is controlled by commands from the adapted consumer electronics device 30 sent over the car area network 35. In any event, the adapted CED 30 performs all its initially designed functions plus it performs gaming, and if desired, other car control functions via the CAN 35. Audio generated by the CED equipment 38 may be routed over the bus to drive speakers already in the car or may be routed to suitable earphone/headset jacks. Video generated by the CED equipment 38 may be routed over an audio/video (A/V) bus to a display 46. An audio/video bus couples the CED equipment 38 and the display 46.

A car area network (CAN) 35, bus, or the like may already be installed by the car manufacturer or an after-sale retailer. If there is no CAN, bus, or the like installed in the car, then a wired bus could be installed or a wireless CAN may be employed using available wireless LAN technology, e.g., IEEE 802.11. Each device coupled to the CAN has its own address or ID and includes a CAN I/F that monitors the data packets being transmitted over the CAN to see if the data packet includes its address. If the packet matches its address, the device processes that packet; otherwise, the device ignores the packet. Any suitable protocol for network data communication may be used. For example, for wired network communications, the Ethernet protocol may be used, and for wireless, any version of IEEE 802.11 may be used. If a wireless network is used, then the devices must be able/adapted to communicate wirelessly. Standard wireless LAN cards may be used.

A first set of example embodiments are based on game servers being located in the car. In that example implementation, a host/buffer board 42 is coupled to the CAN 35 for receiving game selection instructions from the control CED 30. The host/buffer board 42 includes interface logic and one or more buffers and is coupled to one or more game server(s) 44. A game library 40, e.g., in the form of a magnetic hard drive 40 preferably shock mounted, is also coupled to the host/buffer board 42 and stores a number of video games preferably in encrypted form. One or more levels of encryption may be used using, for example, the Data Encryption Standard (DES), double-DES, or any other conventional encryption technique. The game server(s) 44 are coupled to one or more displays 46 via an audio/video (A/V) bus. One or more controllers 48 are coupled to the CAN 35 that includes video game control and play controls for a car occupant to use during game play. Each controller includes a CAN interface, and preferably but not necessarily, each controller 48 is a multifunction controller as described below.

Each entertainment station in the car may be served by a game engine/server 44, and the car occupant at that station may select a game for retrieval by the host/buffer board 42 from the game library 40 by selecting a game from a menu displayed on the display 46 using a controller 48. The game retrieved from the library 40 is routed to the appropriate game engine, e.g., as explained in the above-identified U.S. patent application Ser. No. 10/293,943, which decrypts and executes the video game, and provides the resulting A/V display information to the display 46.

In a car equipped with only one video game capability (i.e., that resident in the game server), the CED acts as a controller for selecting, turning on or off, and/or remotely manipulating game play. A car may be equipped with more than one video game capability. For example, a car may have the capability of a game console represented by the game server and an additional video game capability represented by an emulator or transcompiler running on the CED. In this case, if a user is playing a CED-based emulated video game, the game server (if used) merely acts as a path for the audio and video via an A/V bus.

The hard drive 40 and host/buffer board 42 can support multiple game engines. Interface logic multiplexes access to the hard drive 40 among plural game engines and associated buffers. Hard drive 40 stores a video game library comprising a number of different video games. The hard drive 40 may be formatted into blocks (e.g., 1.5 GB each in one particular implementation). Each block may store a different game. The games are encrypted in the preferred exemplary embodiment such that addressability is preserved.

The host board 42 and the game server(s) 44 can provide any number of real time video game execution sessions simultaneously (e.g., up to a predetermined maximum determined by equipment capabilities) to allow multiple remote users to play video games simultaneously. FIG. 2 illustrates the situation where multiple players are playing the same game at their own displays 46. The host buffer 42 can, for example, start two different execution sessions on two game servers 44 so each car occupant user can play the game simultaneously. If the car occupants indicate a desire to play against one another, the game server can support head-to-head game play to control the same game and play against one other or otherwise participate in the same video game play experience.

Figure 3:
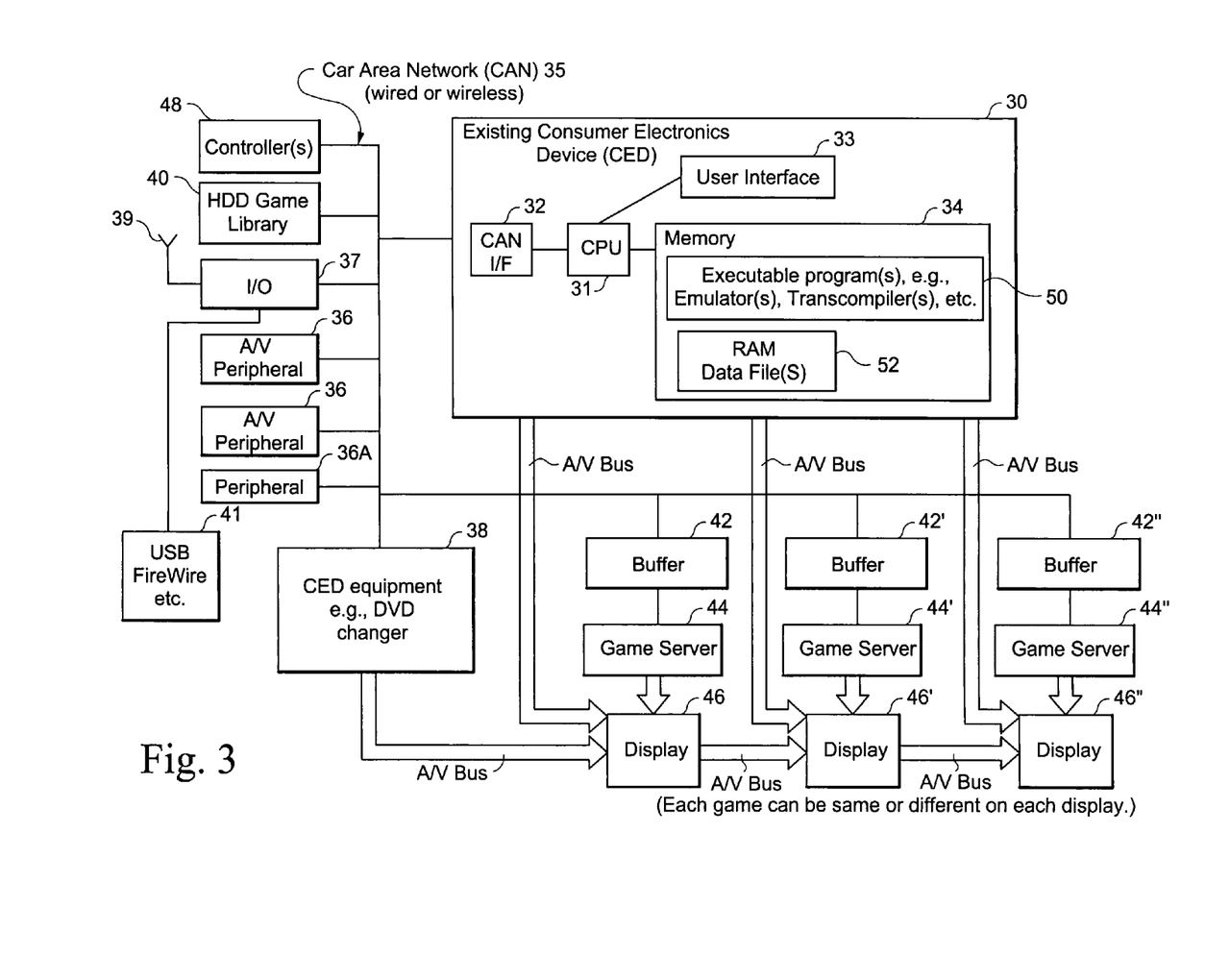
FIG. 3 is a function block diagram showing a second example and non-limiting game server embodiment for a car entertainment and control system integrating video gaming using having a car area network (CAN)

FIG. 3 shows an example embodiment where the multiple buffers 42, 42', and 42" and corresponding multiple game servers 44, 44', and 44" provide multiple real time video game execution sessions simultaneously (e.g., up to a predetermined maximum determined by equipment capabilities) to allow multiple car occupants to play different video games simultaneously. Each buffer/server retrieves via the car area network 35 a different video game from the encrypted game library 40 (shown as a hard disk drive) and executes them on demand.

Each game server can execute an independent video game session. Game servers may comprise modified conventional home video game players such as Nintendo GameCube Systems sold by Nintendo. Of course, game engines could comprise any other video game playing platforms (e.g., Game Boy Advance (ACB), Game boy Color (CGB), Nintendo Dual Screen (DS), Sony PS2, Microsoft XBOX, PCS, a high speed computer emulating a video game platform, etc.), and the game engines could be hardware-implemented, software-implemented, or a combination of both. Nintendo GameCube Systems (and other home video game platforms) typically execute video games from proprietary optical disks or standard optical disks like the DVD used in some commercially available game platforms. But in another non-limiting example, buffers are provided in place of optical disk drives typically found within the video game system. The game engine audio and video outputs may be provided via appropriate frequency converters if necessary so they can be distributed to the appropriate user or users and displayed (an A/V multiplexer may only be needed).

Figure 4:
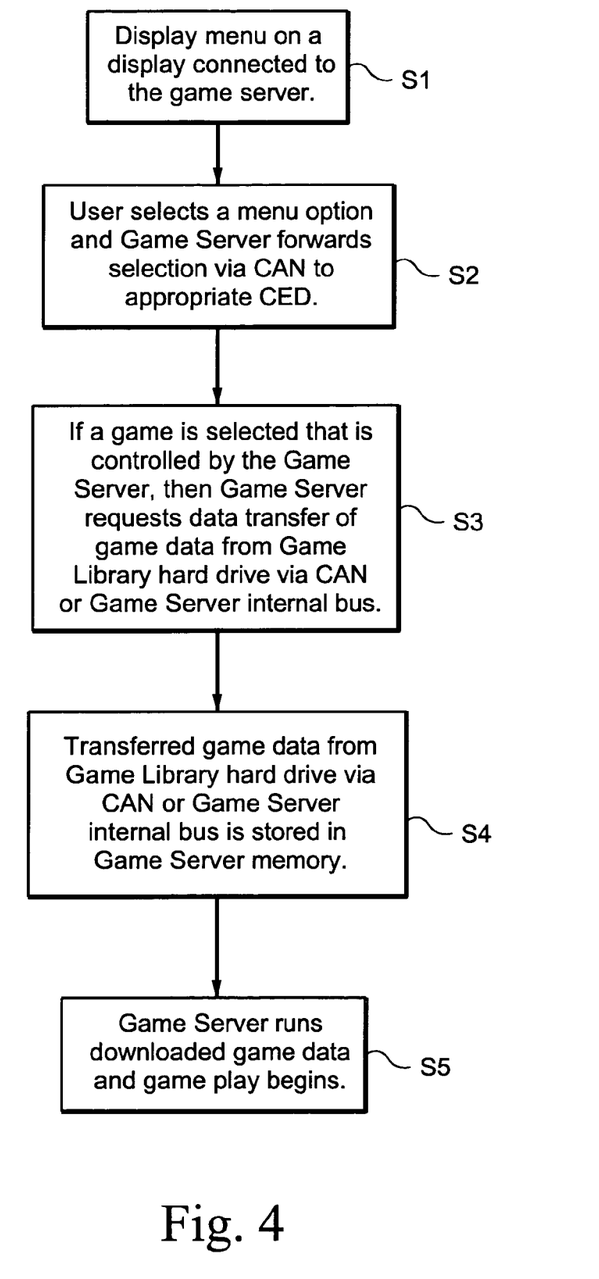
FIG. 4 is a flow chart illustrating non-limiting example procedures for selecting and running a video game using the adapted consumer electronics device and a car area network in accordance with an example game server embodiment.

Reference is now made to the flow chart diagram in FIG. 4 which illustrates example procedures for game play in accordance with a first example embodiment of the car area network-based entertainment system where a buffer 42, a game server 44, and a game library 40 located in the car are used. A menu is displayed on a game display 46 providing a car occupant with a number of consumer electronic device options and gaming options (step S1). The car occupant selects a menu option, and if that selected option relates to another consumer electronic device, the game server 44 forwards the selection via the CAN 35 to the selected CED via the car area network (step S2). The selected CED is then operated in accordance with the car occupant's selection.

If a game is selected that is controlled by the game server 44, then the game server 44 requests transfer of game data from the game library 40 via the CAN 35 or via an internal bus coupling the game server 44 and game library 40 (step S3). The game server may be located internally or externally to the car. The game server 44 stores the transferred game data in memory 52 (step S4). The game server 44 then runs the selected game using the stored game data file and game play begins (step S5).

In another set of example embodiments, the car-based entertainment system may use the control CED as a virtual gaming platform to run PC type video games and/or gaming platform games using an emulator or transcompiler. An emulation implementation is also advantageous when the car does not have a game server within the car, and the game server is external to the car. One example of a suitable emulator is described in commonly-assigned U.S. Pat. No. 6,672,963, the disclosure of which is incorporated herein by reference. An example emulation/transcompilation application applied to a video game distribution network is described in commonly-assigned U.S. Pat. No. 6,884,171, the disclosure of which is incorporated herein by reference.

In an emulation implementation for FIGS. 2 and 3, the control CED 30 receives a video game selection via the car area network 35 and sends a request to a game server (which may be located internally or externally to the car) to retrieve the selected video game file from the game library 40 (which also may be located within the car, as shown, or externally to the car) and to send the selected video game file to the adapted consumer electronics device 30 over the car area network 35 for storage in the memory 34. If the control CED 30 has not yet been adapted or transformed into a virtual video game player, then an emulator or transcompiler application program must first be transferred from the game server to the CED memory 34. Once this is done, the control CED CPU 31 executes this application out of memory 34 and then identifies the user selected video game. The user selected video game is a data file that also needs to be transferred from the game server to the CED memory 34. The game file is a data file stored in memory 52, that is processed by the emulator or transcompiler application software stored in memory 50 to generate the audio and video and controller game information that would be generated if the game program were executed on its native hardware gaming platform.

The audio and video game information generated by the emulator or transcompiler 50 is provided via the CAN 35 to the buffers(s) 42 and game server(s) 44 which then provides that audio and video game information via an A/V bus to game displays 46, 46', and 46". In this configuration, multiple displays are provided to permit multiple players to play the same game simultaneously, with each player having his/her own game controller 48. Alternatively, the audio and video game information may be provided directly from the control CED 30 to the game display(s) via an A/V bus that eliminates the need for buffer 42 and server 44. If the bandwidth of the CAN 35 is high enough to permit satisfactory game play, digitally encoded audio and video game information may be transported in digital form (e.g., MPEG format) from the control CED 30 to the host/buffer 42 via the CAN 35. This approach eliminates the need for including the game server(s) in the car and for an A/V bus to the display(s).

A similar emulation implementation/approach may be applied to the configuration in FIG. 3. A/V buses may connect the audio and video game information from the control CED 30 selectively to each of the displays 46, 46', and 46" via corresponding buffer 42 and game server 44 pair to permit multiple players to play the same or different games simultaneously. Again, each player operates his/her own game controller 48. Alternatively, the control CED 30 may selectively couple the audio and video game information with the displays 46, 46', and 46" using corresponding A/V buses. This eliminates the need for buffer 42 and server 44 pairs in the car. Alternatively, if the CAN 35 bandwidth is sufficient for satisfactory game play, digitally encoded audio and video game information (e.g., MPEG format) may be conveyed digitally over the CAN 35 to each display 46, 46', and 46" (those CAN connections are not shown to simplify the figure).

Figure 5:
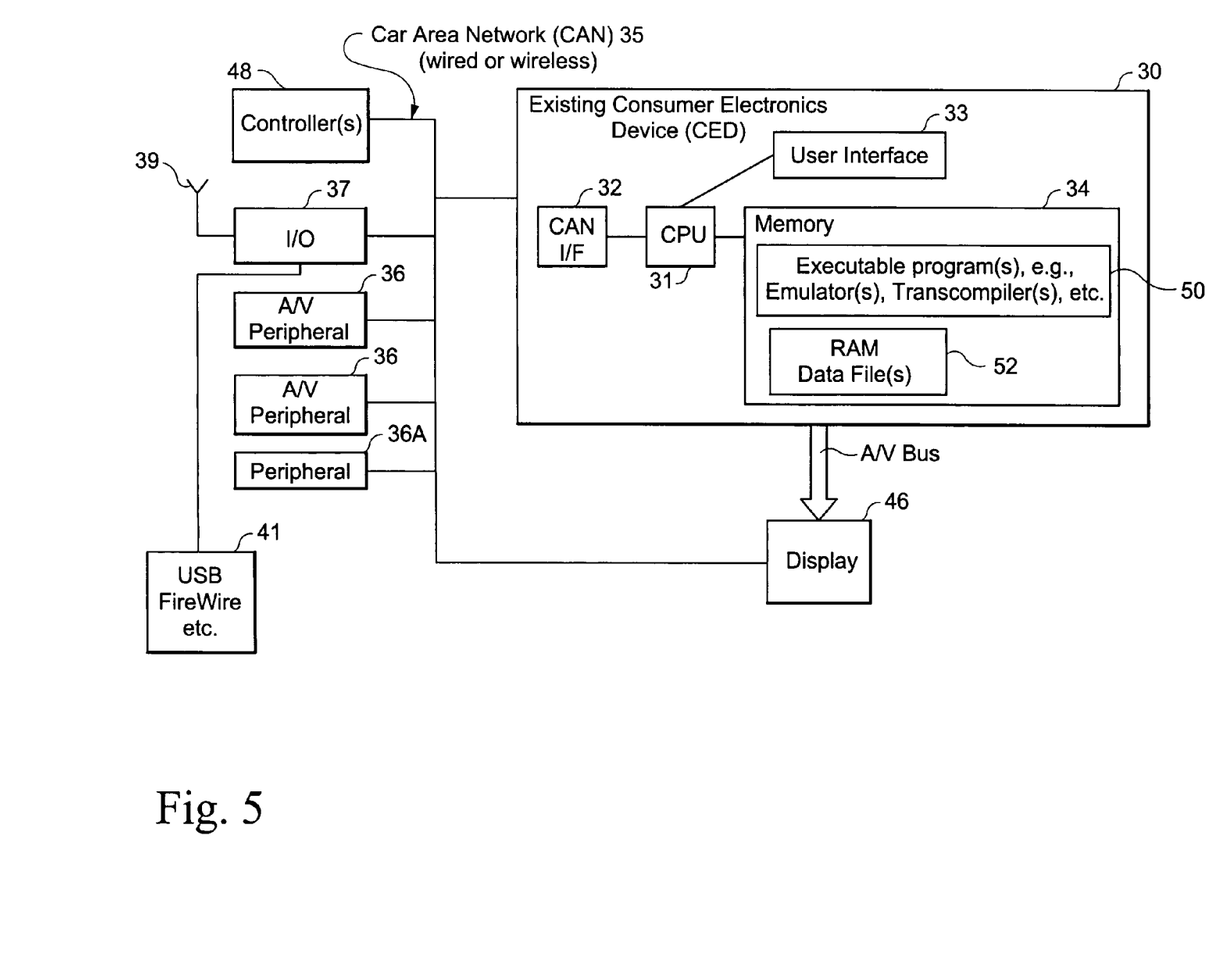
FIG. 5 is a function block diagram showing example and non-limiting emulation embodiments for a car entertainment and control system integrating video gaming using having a car area network (CAN)

FIG. 5 shows another non-limiting example of an emulator implementation. Here, the game server and a game library are located externally to the car, and the input/output block 37 and wireless transceiver are used to effect wireless communications between the game server and the CAN 35. The selected game is routed from the control CED 30 to the external game server 44 via the CAN 35, the I/O 37 with radio transceiver, and the antenna 39 or from the control CED to the USB port 41 from which the game selection is routed to the game server 44 (not shown in this figure) over some other network, such as the Internet. The external game server 44 retrieves the selected game from memory, e.g., a game library 40 also external to the car (not shown in this figure), and sends the game as a data file to the control CED 30 via the reverse path where it is stored as a game data file in the RAM 52. The executable program 50 (e.g., an emulator or transcompiler) is executed by the CPU 31 to run the selected game being emulated. The resulting game information is sent to the display(s) 46 over an A/V bus or over the CAN 35 if the CAN has sufficient bandwidth and the game information is digitally encoded, e.g., MPEG. Game play inputs from the controller 48 are sent to the CED 30 over the CAN 35 for processing by the executable program 50 to effect movement of game objects as would occur during game play on a native gaming platform.

Figure 6:
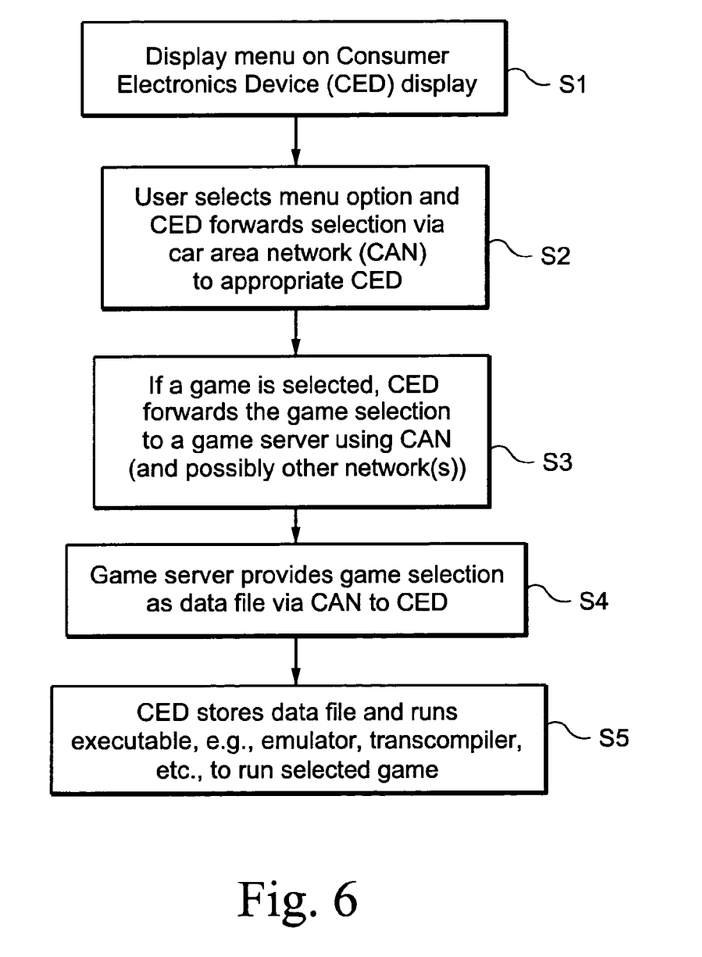
FIG. 6 is a flow chart illustrating non-limiting example procedures for selecting and running a video game using the adapted consumer electronics device and a car area network in accordance with an example is game platform emulation.
Figure 7:
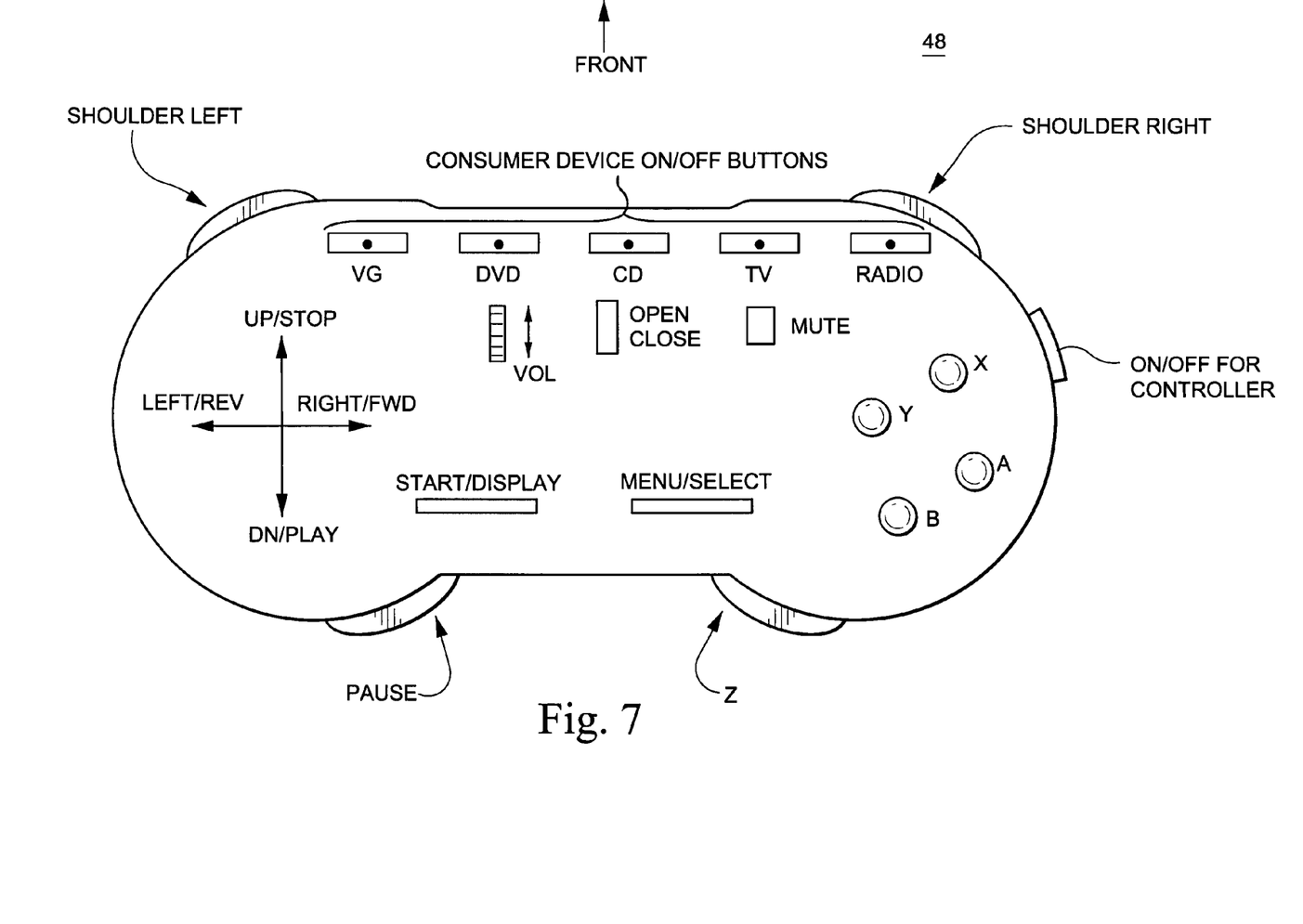
FIG. 7 illustrates an example and non-limiting multimedia controller for controlling various devices in the CAN and also functions as a gaming controller for playing complex video games.

Reference is now made to the flow chart diagram in FIG. 6 which illustrates example procedures for game play in accordance with an example game platform emulation embodiment of a car area network-based entertainment system. A menu is displayed on the consumer electronic device (CED) user interface 33 or on a game display 46 providing a car occupant with a number of consumer electronic device options and gaming options (step S1). The car occupant selects a menu option, and if that selected option relates to another consumer electronic device, that control CED forwards that selection to the selected CED via the car area network (step S2). The selected CED is then operated in accordance with the car occupant's selection.

If a game is selected, the control CED forwards the game selection to a game server via the car area network and possibly other networks (step S3). The game server may be located internally or externally to the car. The game server provides a selected game as a data file by way of the car area network (and possibly other networks) to the control consumer electronic device (step S4). The control consumer electronic device stores the data file and runs executable code, e.g., an emulator, a transcompiler, etc., to run the selected game (step S5).

In a further non-limiting example implementation, the game controller 48 is a multifunction controller 48 which performs both game-related control operations as well as consumer electronic device control operations. A non-limiting example of such a multifunction controller 48 is shown in FIG. 6. The multifunction controller 48 is preferably wireless and may use, for example, an IEEE 802.11 wireless LAN type protocol to communicate with the CAN 35. Alternatively, the controller could be wired to the car area network. In either case, the multifunction controller includes electronic processing circuitry and a suitable CAN interface to effect controller functions and communicate controller inputs via the CAN 35. The multifunction controller 48 is assigned a CAN address or ID just like the other devices coupled to the CAN 35.

The multifunction controller 48 includes a number of selectors which may be implemented in any number of ways including as a button, a switch, a joy stick, etc. The selectors include an ON/OFF selectors for activating or deactivating the controller, and various consumer electronic device ON/OFF selectors. Example consumer electronic device that may be selected include a video game (VG) button, a DVD button, a CD button, a TV button, and a radio button. Of course, other consumer electronic device buttons could be used. A visual indicator, such as a red diode light, may be used to indicate when a particular consumer device has been selected.

The multifunction controller 48 includes a number of directional indicators. In video game mode, the directional indicators include LEFT/RIGHT and UP/DOWN. In a CD/DVD/radio mode, the directional indicators indicate STOP/PLAY and REVERSE/FORWARD. In a TV mode, the directional indicators indicate LEFT/RIGHT or CHANNEL UP/DOWN. There are a number of video game mode play buttons including A, B, X, Y, Z, START, PAUSE, LEFT SHOULDER, RIGHT SHOULDER, SELECT/MENU. The A/SELECT button is used in a DVD, CD, TV, radio mode to select a mode in conjunction with the menu button. The START/DISPLAY button is used to either start game and video game mode or to display settings and activities on the display screen 48. The volume button VOL increases the audio volume. The MUTE button turns audio on or off. The OPEN/CLOSE opens or closes a DVD player or CD player drawer.

The control CED 30 may include an optional game cartridge port to allow car passengers to play games stored on cartridges. Similarly, car passengers may play games stored on CDs or DVDs. The game information is routed over the CAN 35 from the console 30 or the CD/DVD player 38 to the web box 50 for execution.

The input/output interface 37, which includes or is coupled to a radio or other wireless transceiver or wired transceiver, may also be used to receive game updates, new games, or other game-related information (e.g., "cheat codes") over the air from game content providers, retailers, or other commercial entities. Suitable handshaking, authorization, encryption, and/or payment signaling may be incorporated. That information is then routed to the control CED 30 for storage and/or to the library 40 for storage as appropriate. A transceiver would be desirable to permit game or other requests to be sent from the car to a game provider. Established cellular, satellite, or other wireless communications networks and protocols may be used.

A car dealer, other commercial entity, or a user may connect to the CAN 35 using a suitable cable, (e.g., a USB or FireWire cable), and download one or more video games, game updates, or other game related information (e.g., game cheat codes). Games can be sold outright, rented, or provided for free as part of a marketing plan. Rented games can include associated code that instructs the web box when to delete or disable the game after the rental period expires. Game updates may be provided wirelessly, e.g., using WiFi or a cellular network.

The disk storage may be removable and include a communications port. If a game update or new games are desired to be stored on the disk, the user can remove disk unit from the car and couple it via suitable cable or other link (wired or wireless) to a game source. One source might be the user's home or business computer that could be coupled to the storage disk by USB cable.

While the invention has been described in connection with what is presently considered to be the most practical and preferred embodiments, it is to be understood that the invention is not to be limited to the disclosed example embodiments. For example, the invention is not limited to a particular video game or video game platform. Thus, the invention is intended to cover various modifications and equivalent arrangements included within the scope of the appended claims. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

We claim:

1. Apparatus for use in a car, comprising:
    a car area network disposed in a car to enable communications between various devices in the car;
    an existing consumer electronics device corresponding to a DVD player, a CD player, or a car radio system, the existing consumer electronics device being coupled to the car area network and having an existing consumer electronics device function, wherein the consumer electronics device is reprogrammed so that the existing consumer electronics device is transformed into a virtual video game player using a video game emulator or transcompiler program to support an additional control function that includes controlling execution of video games, the consumer electronics device including:
        processing circuitry already existing in the consumer electronics device for the purpose of supporting the existing consumer electronics device function,
        a car area network interface for interfacing the processing circuitry with the car area network;
        a user interface coupled to the processing circuitry;
        a memory, coupled to the processing circuitry, for storing video game emulator or transcompiler program code executable by the processing circuitry for use by the processing circuitry in supporting play of one or more video games;
    a game server coupled to the car area network for assisting the reprogrammed consumer electronics device in supporting play of one or more video games;
    a video game display device coupled to the car area network for displaying video game information to a car occupant in accordance with a game being executed under the control of one or both of the reprogrammed consumer electronics device and the game server;
    a multifunction controller for transmitting control information to the reprogrammed consumer electronics device via the car area network to permit a car occupant to control the reprogrammed consumer electronics device to permit the occupant to play a video game displayed on the video game display; and
    one or more audio or visual devices coupled to the car area network and configured to be controlled by commands transmitted from the reprogrammed consumer electronics device or from the multifunction controller over the car area network.

2. The apparatus in claim 1, wherein the car area network is a wired network or a wireless network.

3. The apparatus in claim 1, wherein the memory is configured to store at least temporarily one or more video game files, and wherein the video game emulator or transcompiler program code is for emulating at least some hardware functionality of at least one dedicated video game platform including emulation of CPU hardware, graphics hardware, and audio hardware functionalities of the one dedicated video game platform based on the one or more video game files.

4. The apparatus in claim 1, further comprising:
    consumer electronics device equipment coupled to the car area network and controlled by commands from the reprogrammed consumer electronics device sent over the car area network.

5. The apparatus in claim 1, wherein the one or more audio or visual devices include one or more of a DVD player, a CD player, a car radio, a GPS navigator, a television, a satellite radio, and a mobile radio.

6. The apparatus in claim 1, wherein the user interface or the video game display is configured to display a menu including video game options and audio or visual device options from which the car occupant may select.

7. The apparatus in claim 6, further comprising:
    multiple displays, connected to the car area network, wherein each of multiple car occupants may view an associated one of the displays while playing the same game simultaneously as the other occupants or while playing different games.

8. The apparatus in claim 6, further comprising:
a game library coupled to the game server,
wherein the game server is configured to receive a video game selection via the car area network and retrieve the selected video game file from the game library for game play.

9. The apparatus in claim 8, wherein the game server is configured to deliver to the video game display buffered audio and visual information from a buffer coupled to the game server.

10. The apparatus in claim 8, wherein the game server is configured to send the selected video game file to the reprogrammed consumer electronics device over the car area network for storage in the memory, the apparatus further comprising:
a host buffer coupled to the game server and to the car area network for buffering audio and visual information for game play received from the reprogrammed consumer electronics device,
wherein the game server is configured to deliver to the video game display device buffered audio and visual information from the host buffer.

11. The apparatus in claim 10, further comprising:
one or more game servers in addition to the game server coupled to the car area network and to multiple video game display devices;
a game library coupled to the game servers;
one or more host buffers, in addition to the host buffer, each host buffer coupled to a corresponding game server and to the car area network for buffering audio and visual information for game play received from the reprogrammed consumer electronics device,
wherein each game server is configured to deliver to a corresponding video game display buffered audio and visual information from the corresponding host buffer.

12. The apparatus in claim 6, further comprising:
a wireless transceiver, and
an input/output block coupled the wireless transceiver and to the car area network,
wherein an external game server and an external game library are located externally to the apparatus,
wherein the external game server is configured to communicate wirelessly with the apparatus via the wireless transceiver, and
wherein the external game server is configured to:
receive a video game selection via the car area network, the input/output block, and the wireless transceiver,
retrieve the selected video game file from the external game library, and
send the selected video game file to the reprogrammed consumer electronics device via the wireless transceiver, the input/output block, and the car area network for storage in the memory.

13. The apparatus in claim 12, wherein the reprogrammed consumer electronics device is configured to deliver to the video game display audio and visual information from the reprogrammed consumer electronics device over an audio/visual bus coupled between the existing consumer electronics device and the video game display.

14. The apparatus in claim 12, wherein the reprogrammed consumer electronics device is configured to deliver to the video game display audio and visual information from the reprogrammed consumer electronics device over the car area network.

15. The apparatus in claim 6, further comprising:
a transceiver or data port for receiving information external to the apparatus, and
an input/output block coupled to the transceiver or data port and to the car area network,
wherein an external game server and an external game library are located externally to the apparatus,
wherein the external game server is configured to communicate over another network with the apparatus via the transceiver or data port, and
wherein the game server is configured to:
receive a video game selection via the car area network, the input/output block, and the transceiver or data port,
retrieve the selected video game file from the game library, and
send the selected video game file to the existing consumer electronics device via the transceiver or data port, the input/output block, and the car area network for storage in the memory.

16. The apparatus in claim 15, wherein the reprogrammed consumer electronics device is configured to deliver to the video game display audio and visual information from the reprogrammed consumer electronics device over an audio/visual bus coupled between the reprogrammed consumer electronics device and the video game display.

17. The apparatus in claim 15, wherein the reprogrammed consumer electronics device is configured to deliver to the video game display audio and visual information from the reprogrammed consumer electronics device over the car area network.

18. The apparatus in claim 1, further comprising:
a game library coupled to the car area network;
a transceiver or data port for receiving information external to the apparatus, and
an input/output block coupled to the transceiver or data port and to the car area network,
wherein new games, game updates, or other game related data are received via the transceiver or data port and the input/output block and stored in the game library.

19. The apparatus in claim 1, wherein the multifunction controller is configured to control the reprogrammed consumer electronics device to perform the reprogrammed consumer electronics device function.

20. The apparatus in claim 19, wherein the multifunction controller includes device selection buttons to select one of the audio or visual devices or the reprogrammed consumer electronics device, one or more device control buttons, a menu/select button, and video game control buttons for controlling movement of game objects on the video game display during game play.

21. The apparatus in claim 20, wherein the multifunction controller, the reprogrammed consumer electronics device, and audio or visual devices each has a car area network (CAN) address and each is configured to monitor the CAN for packets addressed to it.

22. The apparatus in claim 21, wherein the reprogrammed consumer electronics device identifies game control responses from the multifunction controller for purposes of game play.

23. The apparatus in claim 1, further comprising multiple reprogrammed consumer electronics devices configured together to function as a video game player.

24. Apparatus for use in a car, comprising:
a car area network disposed in a car to enable communications between various devices in the car;

an existing consumer electronics device corresponding to a DVD player, a CD player, or a car radio system, the existing consumer electronics device being coupled to the car area network and having an existing consumer electronics device function, wherein the consumer electronics device is also reconfigured using a video game emulator or transcompiler program to function as a virtual video game platform to support play of video games, the existing consumer electronics device including:

native processing circuitry already existing in the consumer electronics device for the purpose of supporting the existing consumer electronics device function, a car area network interface for interfacing the processing circuitry with the car area network;

a user interface coupled to the processing circuitry;

a memory, coupled to the processing circuitry, for storing video game emulator or transcompiler program code executable by the processing circuitry and for storing at least temporarily one or more video game files for use by the processing circuitry in executing one or more video games based on the one or more video game files;

a video game display device coupled to the car area network for displaying video game information to a car occupant in accordance with a game being executed under the control of the reconfigured consumer electronics device;

a multifunction controller for transmitting control information to the reprogrammed consumer electronics device via the car area network to permit a car occupant to control the reconfigured consumer electronics device to permit the occupant to play a video game using the video game display; and one or more audio or visual devices coupled to the car area network and configured to be controlled by commands transmitted from the reconfigured consumer electronics device or from the multimedia controller over the car area network.

25. The apparatus in claim 24, further comprising multiple reconfigured consumer electronics devices configured together to function as a video game platform.

26. A method for using a car area network disposed in a car to enable communications between various existing consumer electronic devices in the car, comprising:

adapting one or more of the existing consumer electronic devices using a video game emulator or transcompiler program so that the adapted consumer electronic device functions as a virtual video game platform to support play of video games, where the adapted consumer electronic device corresponds to one or more of a DVD player, a CD player, or a car radio system;

displaying a menu including consumer electronic device options and video game options to a car occupant;

receiving over the car area network at the adapted consumer electronic device the selected menu option;

if the selected menu option is a video game, providing the game selection to the adapted consumer electronic device over the car area network;

downloading a game data file corresponding to the game selection over the car area network to the adapted consumer electronic device;

executing the video game emulator or transcompiler program in the adapted consumer electronic device in order to run the selected video game corresponding to the stored game data file;

displaying audio and video game information to the car occupant; and transmitting game play commands from the car occupant entered on a controller by the car occupant from the controller over the car area network to the adapted consumer electronic device.

27. The method in claim 26, wherein the car area network is a wired network or a wireless network.

28. The method in claim 26, wherein the executing includes emulating at least some hardware functionality of at least one dedicated video game platform including emulation of CPU hardware, graphics hardware, and audio hardware functionalities of the one dedicated video game platform.

29. The method in claim 26, further comprising:

controlling consumer electronics device equipment coupled to the car area network using commands from the adapted consumer electronics device sent over the car area network.

30. The method in claim 26, wherein the adapted consumer electronics device delivers to the video game display audio and visual information from the adapted consumer electronics device over an audio/visual bus coupled between the adapted consumer electronic device and the video game display.

31. The method in claim 26, wherein the adapted consumer electronics device is configured to deliver to the video game display audio and visual information from the adapted consumer electronics device over the car area network.

* * * * *